United States Patent
Pawar et al.

(10) Patent No.: US 9,420,474 B1
(45) Date of Patent: Aug. 16, 2016

(54) BEAMFORMING SELECTION FOR MACRO CELLS BASED ON SMALL CELL AVAILABILITY

(71) Applicant: SPRINT COMMUNICATIONS COMPANY L.P., Overland Park, KS (US)

(72) Inventors: Hemanth Balaji Pawar, Brambleton, VA (US); Krishna Datt Sitaram, Chantilly, VA (US); Daniel Alberto Vivanco, Sterling, VA (US); Shilpa Kowdley Srinivas, Brambleton, VA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/618,984

(22) Filed: Feb. 10, 2015

(51) Int. Cl.
*H04W 4/00* (2009.01)
*H04W 16/28* (2009.01)
*H04W 88/08* (2009.01)
*H04W 24/02* (2009.01)

(52) U.S. Cl.
CPC ............. *H04W 16/28* (2013.01); *H04W 24/02* (2013.01); *H04W 88/08* (2013.01)

(58) Field of Classification Search
CPC ............................ H04W 64/00; H04B 7/024
USPC ................ 455/456.1, 277.2, 452.1, 552.1; 342/354; 381/56
See application file for complete search history.

(56) References Cited

U.S. PATENT DOCUMENTS

| | | | | |
|---|---|---|---|---|
| 5,745,841 | A * | 4/1998 | Reudink | H04W 16/28 455/277.2 |
| 7,016,649 | B1 * | 3/2006 | Narasimhan | H01Q 1/246 455/552.1 |
| 7,206,608 | B1 * | 4/2007 | Wu | H04W 16/28 342/354 |
| 8,238,832 | B1 * | 8/2012 | Zhou | H04B 7/0408 455/41.2 |
| 2005/0239475 | A1 * | 10/2005 | Voltolina | H04W 64/00 455/456.1 |
| 2011/0038486 | A1 * | 2/2011 | Beaucoup | H04R 3/005 381/56 |
| 2011/0059706 | A1 * | 3/2011 | Harel | H04B 7/0404 455/115.1 |
| 2011/0306381 | A1 * | 12/2011 | Jia | H04B 7/024 455/522 |
| 2012/0202431 | A1 * | 8/2012 | Hawryluck | H04B 7/024 455/63.4 |
| 2015/0045048 | A1 * | 2/2015 | Xu | H04W 64/00 455/452.1 |

* cited by examiner

*Primary Examiner* — Charles Shedrick

(57) ABSTRACT

A method includes communicating data to a plurality of user equipment (UE) in a cell using a plurality of beamforms. Each of the plurality of beamforms has a main lobe and side lobes, where the main lobe is directed toward a corresponding UE of the plurality of UE. For each beamform of the plurality of beamforms, a position of the beamform is determined. Furthermore, it is determined that one or more small cells of the plurality of small cells are available to serve the corresponding UE based on determining that the one or more small cells are positioned within the main lobe of the beamform using the determined position of the beamform and one or more positions of the one or more small cells. Based on the one or more small cells being determined as available to serve the corresponding UE, beamforming is disabled to the corresponding UE from the cell, thereby preventing the side lobes of the beamform from interfering with other radio communications in the cell.

20 Claims, 9 Drawing Sheets

BEAMFORMING SELECTION FOR MACRO CELLS BASED ON SMALL CELL AVAILABILITY

SUMMARY

The present disclosure is directed, in part, to beamforming selection for macro cells based on small cell availability, substantially as shown in and/or described in connection with at least one of the figures, and as set forth more completely in the claims.

In certain respects, beamforming is utilized by a macro cell to communicate with user equipment (UE) in a cell of one or more wireless networks. Beamforming offers many advantages, particularly with respect to a UE being served by a beamform. However, a beamform to a UE may at times cause interference that degrades performance of other equipment in a cell, such as other UE. To illustrate the foregoing, a beamform to a UE may include a main lobe directed toward the UE for communication therewith. Side lobes of the beamform may interfere with radio communications of other equipment, such as UE that are not being served via beamforming.

In accordance with implementations of the present disclosure, beamforming to UE from the macro cell is disabled based at least in part on the availability of one or more small cells to serve the UE. Where a UE can sufficiently be served by at least one small cell, beamforming to the UE from the macro cell can be disabled without significantly impacting communications performance between the UE and the one or more wireless networks. Furthermore, interference that is caused by beamforming to the UE from the macro cell and that degrades performance with respect to other equipment is eliminated. Thus, on the aggregate, performance of equipment in the cell can be improved.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
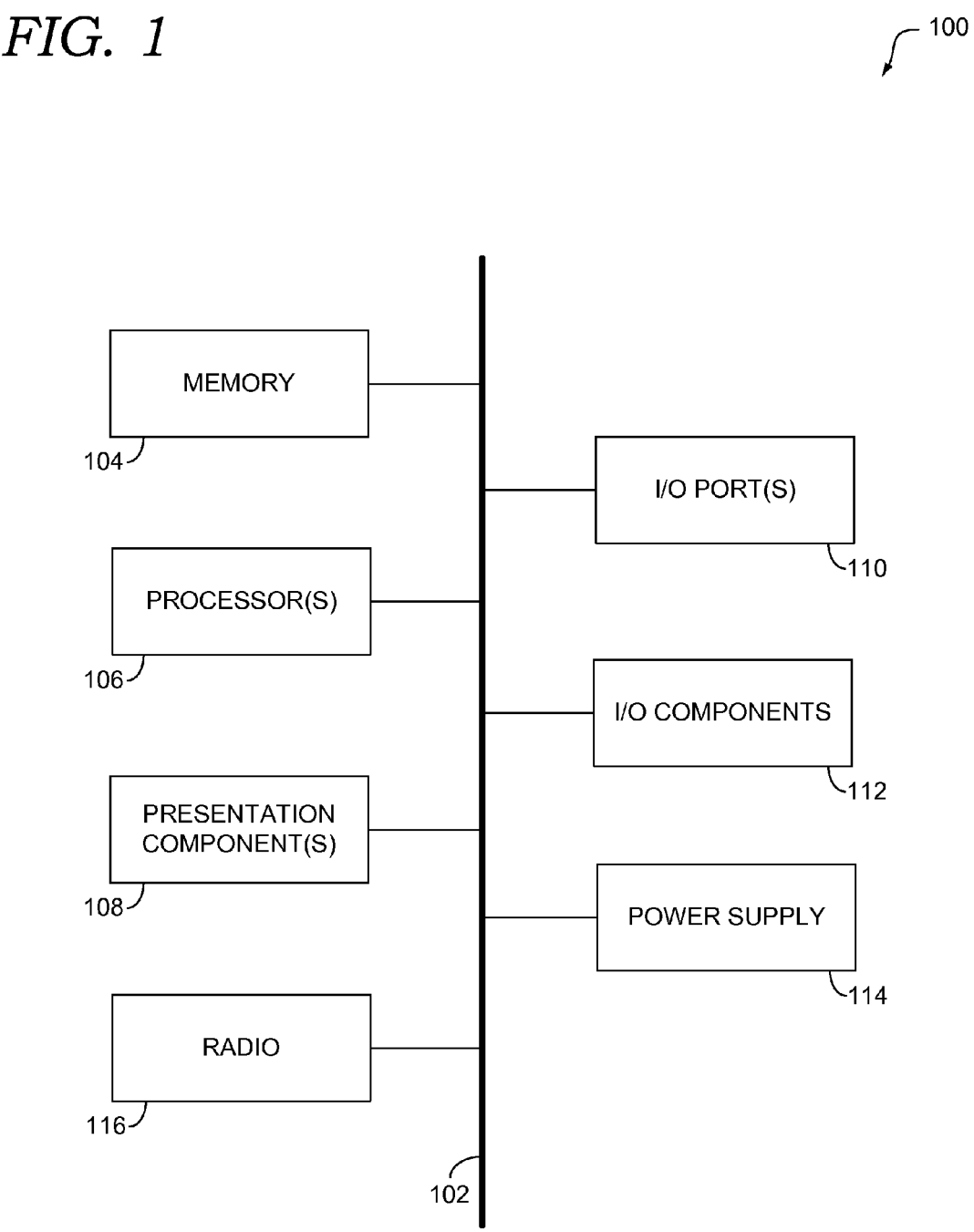
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain respects, beamforming is utilized by a macro cell to communicate with user equipment (UE) in a cell of one or more wireless networks. Beamforming offers many advantages, particularly with respect to a UE being served by a beamform. However, a beamform to a UE may at times cause interference that degrades performance of other equipment in a cell, such as other UE. To illustrate the foregoing, a beamform to a UE may include a main lobe directed toward the UE for communication therewith. Side lobes of the beamform may interfere with radio communications of other equipment, such as UE that are not being served via beamforming.

In accordance with implementations of the present disclosure, beamforming to UE from the macro cell is disabled based at least in part on the availability of one or more small cells to serve the UE. Where a UE can sufficiently be served by at least one small cell, beamforming to the UE from the macro cell can be disabled without significantly impacting communications performance between the UE and the one or more wireless networks. Furthermore, interference that is caused by beamforming to the UE from the macro cell and that degrades performance with respect to other equipment is eliminated. Thus, on the aggregate, performance of equipment in the cell can be improved.

In some aspects of the present disclosure, in determining whether to disable a beamform from a macro cell to a UE, the availability of small cells to serve the UE may be based on positions of the small cells with respect to the beamform and/or with respect to the UE corresponding to the beamform. For example, small cells can be determined as being available to serve the UE based on determining that small cell base stations and/or coverage areas of the small cells are positioned within a main lobe of the beamform. In addition, or instead, small cells can be determined as being available to serve the UE based on determining that the UE is positioned within one or more of the coverage areas of the small cells. Availability to serve also may be based on alternative or additional factors, such as loading on the small cells, a number of UE already being served on the small cells, distance between the UE and the small cells, and more.

In further respects, beamforming may be enabled for UE (e.g., re-enabled) with respect to the macro cell based on the availability of small cells to sufficiently serve the UE. For example, beamforming may be enabled for a UE where small cells are unavailable to sufficiently serve the UE. The availability of the small cells to sufficiently serve the UE need not be determined based on the same criteria or factors utilized in determining whether to disable beamforming to a UE. In some implementations, UE that have beamforming disabled, such as those that transition from a connection to the macro cell to a connection to one or more small cells are tracked. The beamforming may be enabled based on the tracked UE reconnecting to the macro cell from one or more small cells. As an example, the UE may reconnect to the base station by moving out of one or more small cell coverage areas. In some cases, the unavailability of one or more small cells to sufficiently serve the UE may be implicit in detecting a tracked UE reconnecting to the macro cell. Thus, network resources can be conserved by reducing complex processing that may otherwise be utilized to determine the availability.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
    4G Fourth-Generation Wireless Telephone Technology
    CDMA Code Division Multiple Access
    WCDMA Wideband Code Division Multiple Access
    HSDPA High-Speed Downlink Packet Access
    CD-ROM Compact Disk Read Only Memory
    EEPROM Electrically Erasable Programmable Read Only Memory
    ENODEB Evolved Node B
    GPRS General Packet Radio Service
    GPS Global Positioning System
    GSM Global System for Mobile Communications
    LTE Long Term Evolution
    PC Personal Computer
    PDA Personal Digital Assistant
    RAM Random Access Memory
    RF Radio Frequency
    ROM Read Only Memory
    TDMA Time Division Multiple Access
    UMTS Universal Mobile Telecommunications Systems
    VoIP Voice over IP
    Wi-Fi Wireless Fidelity
    WiMAX Worldwide Interoperability for Microwave Access
    UE User Equipment
    SRS Sounding Reference Signal Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types Implementations of the present disclosure may be practiced in a variety of system configurations, including handheld devices, consumer electronics, general-purpose computers, specialty computing devices, etc Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2A:
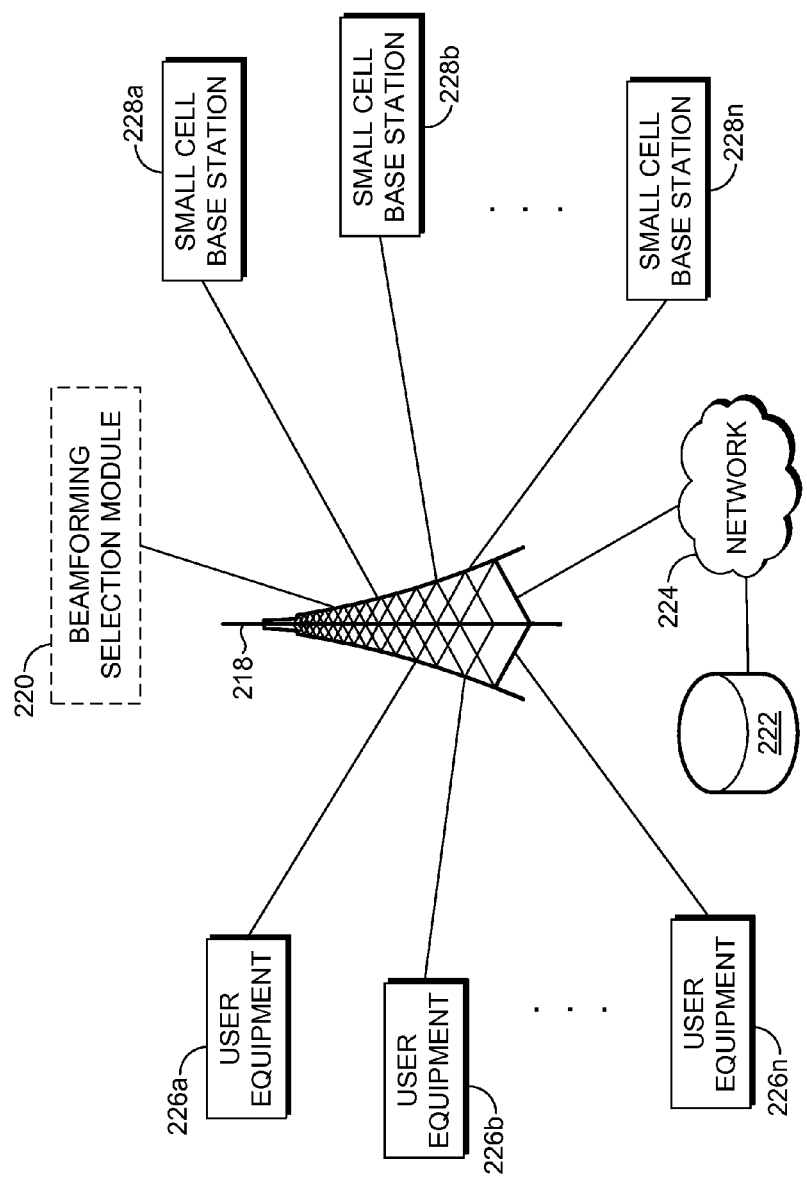
FIG. 2A illustrates a diagram of an exemplary network environment in which implementations of the present disclosure may be employed.

Turning to FIG. 2A, FIG. 2A provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes macro cell base station 218, beamforming selection module 220, database 222, network 224, UE 226a and 226b through 226n, and small cell base stations 228a and 228b through 228n. In network environment 200, UE, such as UE 226a and 226b through 226n may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

In some respects, the UE can correspond to computing device 100 in FIG. 1. Thus, a UE can include, for example, a display(s), a power source(s) (e.g., a battery), a data store(s), a speaker(s), memory, a buffer(s), a radio(s) and the like. In some implementations, a UE comprises a wireless or mobile device which can use a wireless network(s) for communication (e.g., voice and/or data communication). In this regard, the UE can be any mobile computing device that communicates by way of a wireless network, for example, a wireless telecommunications network, such as a 3G and/or 4G network.

Network 224 can be part of the wireless network that can connect subscribers to their immediate service provider. The wireless network can include an array of devices or components (e.g., one or more base stations), some of which are not shown. Those devices or components may form network environments similar to what is shown in FIG. 2A, and may also perform methods in accordance with the present disclosure. Components such as terminals, links, and nodes (as well as other components) can provide connectivity in various implementations. Network 224 can include multiple networks, as well as being a network of networks, but is shown in more simple form so as to not obscure other aspects of the present disclosure.

In some instances, network 224 is associated with a telecommunications provider that provides services (e.g., over LTE) to UE, such as UE 226a and 226b through 226n. For example, network 224 may provide voice services to UE or corresponding users that are registered or subscribed to utilize the services provided by a telecommunications provider. Network 224 can comprise any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In some cases, the UE in network environment 200 can utilize network 224 to communicate with other computing devices, or equipment, (e.g., a mobile device(s), a server(s), a personal computer(s), etc.) through one or more communication links over air interfaces with macro cell base station 218. Macro cell base station 218 can provide a coverage area corresponding to a macro cell of network environment 200. The present implementation will be described with respect to macro cell base station 218 being an eNodeB of an LTE network, by way of example. However, macro cell base station 218 may correspond to a component of a wireless system that employs any of a variety of wireless technologies, in addition to, or instead of LTE.

Furthermore, the UE in network environment 200 can also utilize network 224 to communicate with the other computing devices through one or more communication links over air interfaces with one or more of small cell base stations 228a and 228b through 228n. Small cell base stations 228a and 228b through 228n can provide respective coverage areas corresponding to small cells of network environment 200. Examples of suitable small cell base stations include any combination of a femtocell base station, a picocell base station, a microcell base station, a low-cost internet base station (LCIB), and the like.

In some cases, for a UE, one to all of the communication links with macro cell base station 218 and/or one or more of small cell base stations 228a and 228b through 228n may be active concurrently. In other cases, a UE may only connect to a single cell at a given time, or the UE may only connect to multiple small cells while the UE is disconnected from the macro cell base station. It will therefore be appreciated that the number and/or type of active communication links available for a UE at a given time may have any of a variety of possible restrictions, while still being within the scope of the present disclosure.

Furthermore, the communication links that are active for a UE may be based on any combination of various factors, some of which include an operational state of the UE, a physical location of the UE with respect to macro cell base station 218 and/or one or more of small cell base stations 228a and 228b through 228n and/or coverage areas thereof, the type of communication session the UE seeks to initiate or is engaged in over network 224, and signal strength and/or signal quality available for the communication links.

In some implementations, the wireless network that includes network 224 comprises a heterogeneous network. A heterogeneous network can correspond to a wireless network that provides wireless services to UE over multiple types of access nodes, such as wireless LAN (e.g. via one or more of the small cells) and wireless WAN (e.g. via the macro cell). By employing a heterogeneous network, or Het-Net, macro cell base station 218 and small cell base stations 228a and 228b through 228n can be utilized cooperatively by the wireless network to offer wireless network coverage in an environment with a wide variety of wireless coverage areas, ranging from outdoor environments to office buildings, homes, and underground. The Het-Net can implement handoff capability to maintain wireless service when switching between access nodes.

As indicated above, macro cell base station 218, which may also be referred to as a macro cell site, is configured to communicate with UE, such as UE 226a and UE 226b through UE 226n that are located within the geographical area, or macro cell, covered by radio antennas of macro cell base station 218. Macro cell base station 218 can communicate with one to all of the UE using beamforming. For example, in the present implementation, adaptive beamforming can be employed to communicate with at least some of the UE. Macro cell base station 218 may also optionally communicate with any of the various UE without beamforming. As an example, a directional antenna of macro cell base station 218 could be employed to communicate with a UE without beamforming. In some cases, the directional antenna may be employed to communicate with the UE without beamforming based on beamforming to the UE being disabled by beamforming selection module 220 and/or one or more macro RF schedulers of macro cell base station 218.

Where macro cell base station 218 communicates with UE using beamforming, there is a risk that the beamforms to the UE cause interference that degrades performance of other equipment in the macro cell, such as other UE. An example of the forgoing is discussed below with reference to FIG. 2B with FIG. 2A.

Figure 2B:
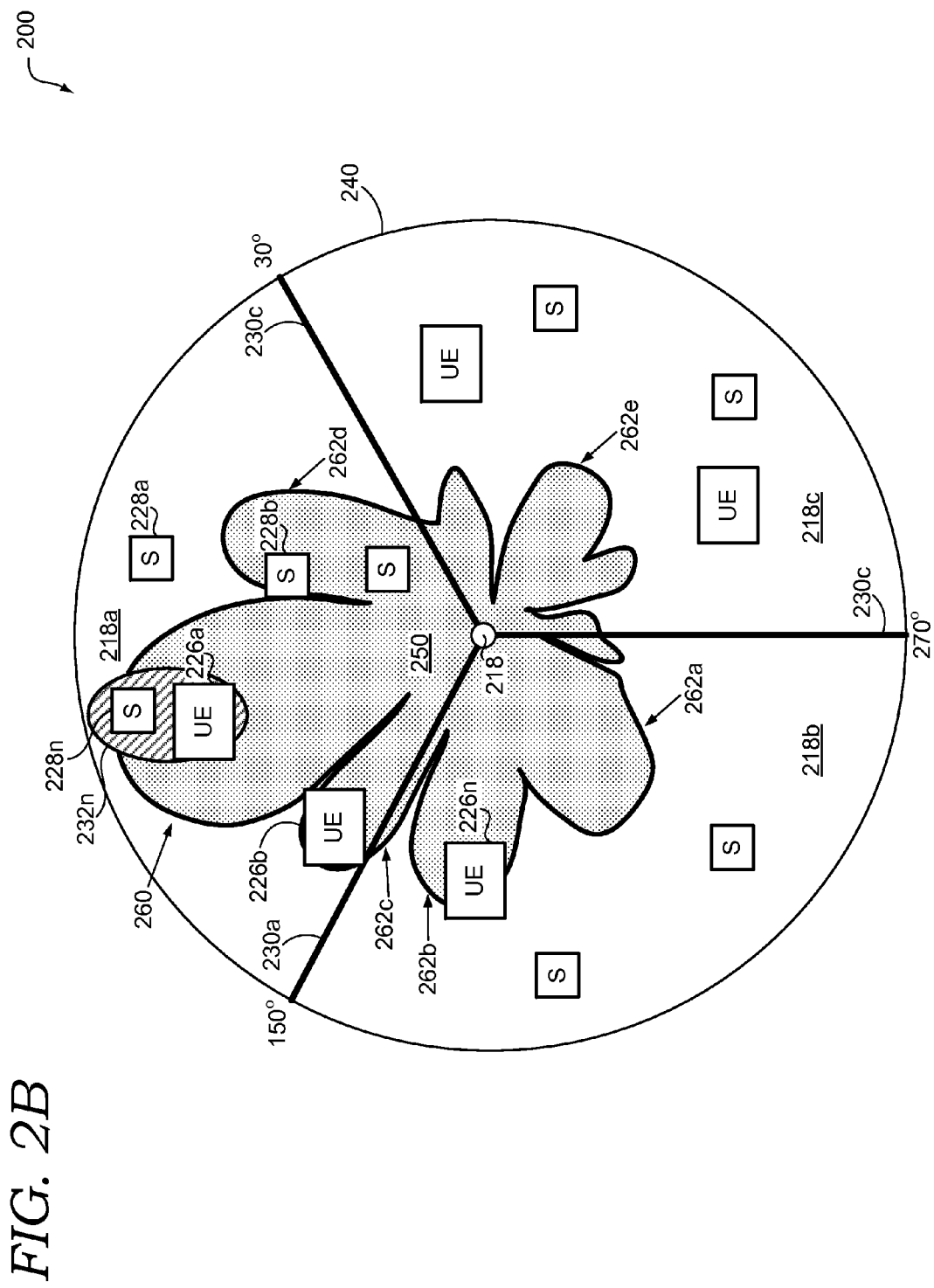
FIG. 2B illustrates a top view of an exemplary network environment in which implementations of the present disclosure may be employed.

Referring to FIG. 2B with FIG. 2A, FIG. 2B shows an exemplary cell in which implementations of the present disclosure may be employed. In particular FIG. 2B shows cell 240 comprising a plurality of UE including UE 226a and UE 226b through UE 226n, and a plurality of small cells including small cell base stations 228a and 228b through 228n.

FIG. 2B shows macro cell base station 218 transmitting beamform 250 to UE 226a in sector 218a. As shown, beamform 250 comprises main lobe 260 and a plurality of side lobes, of which side lobes 262a, 262b, 262c, 262d, and 262e are individually labeled. Main lobe 260 is directed toward UE 226a and provides a high performance communication link between cell 240 and UE 226a. However, the side lobes of beamform 250 can cause interference that that degrades performance of other equipment in cell 240, such as other UE or other equipment. For example, side lobe 262c may cause interference that degrades performance of a communication link between macro cell base station 218 and UE 226b. This communication link may or may not comprise a beamform. The performance of the communication link may particularly be susceptible to interference where a directional antenna is employed by macro cell base station 218 to form a communication link with UE 226b without beamforming.

In implementations where cell 240 is divided into a plurality of sectors, interference caused by beamforming to a UE may degrade performance of communication links with not only UE positioned within the same sector as the UE, such as UE 226b, described above, but also with UE in other sectors. For example, as shown, cell 240 is divided into a plurality of sectors, shown as sectors 218a, 218b, and 218c. Sectors 218a, 218b, and 218c are defined by borders 230a, 230b, and 230c. In the example shown, adjoining, or neighboring, ones of sectors 218a, 218b, and 218c have shared boundaries. Although cell 240 has three sectors in the present example, more or fewer sectors can be included in a cell in accordance with implementations of the present disclosure. In FIG. 2B, side lobe 262b may cause interference that degrades performance of a communication link between macro cell base station 218 and UE 226n in sector 218b.

As with UE 226b, the above mentioned communication link between UE 226n and macro cell base station 218 may or may not employ a beamform. However, as described above, macro cell base station 218 comprises an eNodeB of an LTE network, by way of example. Orthogonal frequency-division multiple access based systems, such as LTE, are prone to inter-sector interference as they are commonly deployed with a frequency reuse factor of 1. For example, the communication link with UE 226n might comprise a beamform transmitted at substantially the same frequencies as beamform 250. In this case, the interference caused by beamform 250 may especially degrade performance of the communication link between macro cell base station 218 and UE 226*n*.

While only beamform 250 is shown in FIG. 2B for clarity of disclosure, any number of other beamforms may be concurrently active in cell 240. Those beamforms could be for communication links with any of the various equipment in cell 240, some of which are shown in FIG. 2B. Furthermore, those beamforms can cause interference similar to beamform 250. In this regard, network environment 200 includes beamforming selection module 220, which can selectively disable beamforming from cell 240 (i.e., from macro cell base station 218) to UE in cell 240 to reduce such interference caused by beamforms in network environment 200.

Macro cell base station 218 is associated with beamforming selection module 220, which comprises various components that are utilized, in various implementations, to perform one or more methods for beamforming selection for macro cells based on small cell availability to serve UE. In some implementations, beamforming selection module 220 comprises components of macro cell base station 218. For example, beamforming selection module 220 may be integrated into macro cell base station 218. In other implementations, at least one component of beamforming selection module 220 is separate from macro cell base station 218. For example, beamforming selection module 220 may be coupled to macro cell base station 218 via network 224. In some cases, beamforming selection module 220 may be located within cell 240. In other cases, beamforming selection module 220 may at least partially be located outside of cell 240. As an example, beamforming selection module 220 may be located at least partially at the evolved packet core (EPC) of network environment 200.

Beamforming selection module 220 is configured to selectively disable beamforming to UE from macro cell base station 218 so as to eliminate interference that may be caused by beamforming to those UE. In particular, beamforming selection module 220, can select to disable beamforming to UE from macro cell base station 218 based at least in part on the availability of one or more small cells to serve the UE. Where a UE can sufficiently be served by at least one small cell, beamforming to the UE from macro cell base station 218 can be disabled without significantly impacting communications performance between the UE and network 224. Furthermore, interference caused by beamforming to the UE is eliminated. Thus, on the aggregate, communications performance of equipment in the cell can be improved.

Beamforming selection module 220 is configured to determine whether one or more small cells are available to serve a UE. Whether a small cell is available to serve a UE can be based on any of a variety of potential factors. In some implementations, such a determination is based, at least in part on beamforming selection module 220 analyzing positions (i.e., position data) of small cells with respect to the beamform and/or with respect to a UE corresponding to the beamform. For example, with respect to FIG. 2B, beamforming selection module 220 may utilize those positions to determine that small cell base station 228*n* is available to serve UE 226*a*, at least in part due to the small cell corresponding to small cell base station 228*n* being positioned within main lobe 260 of beamform 250. Such a determination may analyze a position of small cell base station 228*n* and/or a position of coverage area 232*n* relative to a position of beamform 250 (e.g., a position of main lobe 260).

In addition, or instead, beamforming selection module 220 may analyze a position of the UE with respect to a position of the small cell (e.g., a position of coverage area 232*n* and/or small cell base station 228*n*). For example, beamforming selection module 220 may utilize this position data to determine availability at least in part by determining whether the UE is within coverage area 232*n* of small cell base station 228*n*. Such a determination could be made, for example, based on small cell base station 228*n* being located within a threshold distance of UE 226*a*. As another example, coverage area position data could be compared to UE position data to determine whether the UE position overlaps with the coverage area.

In analyzing the aforementioned positions, beamforming selection module 220 can monitor the positions in cell 240. At least some of the positions may be based on monitored positions of the UE in cell 240. For example, beamforming selection module 220 may monitor positions of any of the UE in cell 240. As the UE comprise mobile devices in many implementations, the monitored positions can change over time, which may impact the outcome of beamforming selection module 220 determining whether to disable beamforming to the UE. Thus, the positions of the UE may be determined periodically, such as every 30 milliseconds, every second, or at other increments or intervals, so that beamforming selection module 220 can employ contemporary position data.

Similarly, beamforming selection module 220 can monitor positions of any of the small cells in cell 240. Although many small cells might change position less frequently than mobile devices, due to the pick and place nature of some small cells, it may be desirable to also periodically determine positions of at least some the small cells (e.g., with the positions of the UE). Having determined the positions, beamforming selection module 220 may analyze the monitored positions to determine whether to disable beamforming to the UE from the macro cell.

In some implementations, UE and/or small cells respectively report corresponding positions to beamforming selection module 220. For example, at least some of the equipment (e.g., a UE or a small cell) may include a GPS or other location detecting means to determine location data that corresponds to a location of the equipment. The equipment may provide the location data, which may comprise one or more GPS coordinates, or coordinates derived therefrom, to beamforming selection module 220.

In various implementations, positions of equipment are determined from radio frequency (RF) communications between macro cell base station 218 and the equipment. For example, a suitable RF communication employed to determine the position of equipment is a sounding reference signal (SRS) from the equipment. In some cases, macro cell base station 218 allocates resources for a SRS from the equipment. The equipment sends the SRS to macro cell base station 218, and macro cell base station 218 and/or beamforming selection module 220 processes the received SRS to determine the position of the equipment. The SRS may be received by multiple antennas of macro cell base station 218 in order to determine the position of the equipment.

Determining positions of equipment can comprise determining a Direction of Arrival (DoA) of an RF communication from the equipment. Suitable algorithms for determining DOA include MUltiple SIgnal Classification (MUSIC) and Estimation of Signal Parameter via Rotational Invariance Technique (ESPRIT). Although DoA is contemplated as being suitable, in some implementations, Direction of Departure (DoD) can be employed either to or from the equipment.

In some cases, beamforming selection module 220 may identify positions of at least some of the equipment from a database. For example, beamforming selection module 220 can identify the positions of the one or more small cells from database 222, which can be a heterogeneous network system database. The heterogeneous network system database can be a part of the core network of network 224. In some implementations, the positions are from location data provided to database 222 through network 224 or by other means. The location data may be manually entered by a user or may be automatically provided. In some cases, the location data of a small cell is provided as part of an installation process for the small cell.

Figure 2C:
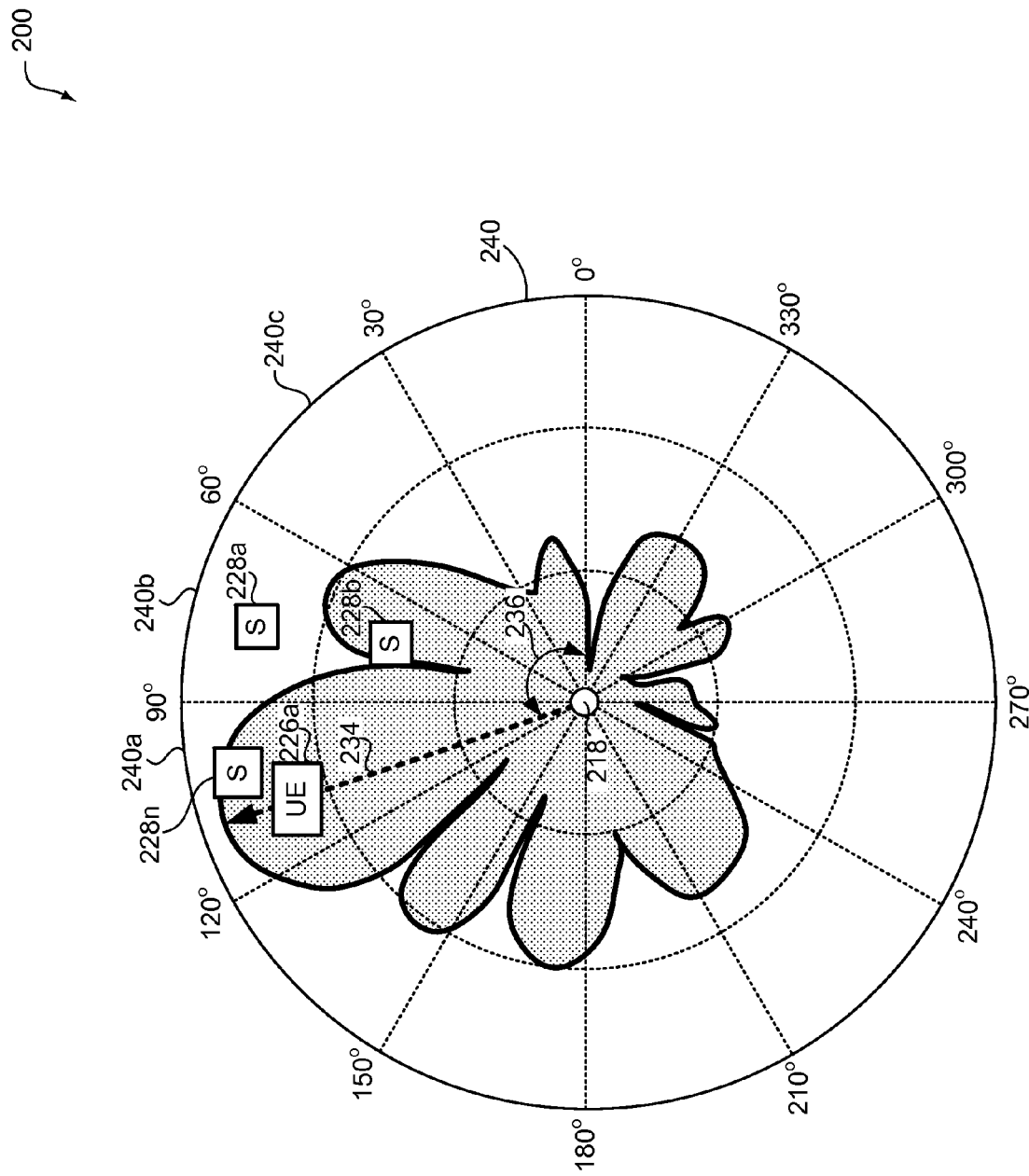
FIG. 2C illustrates a top view of an exemplary network environment in which implementations of the present disclosure may be employed.

Referring now to FIG. 2C, FIG. 2C shows an exemplary cell in which implementations of the present disclosure may be employed. In particular, FIG. 2C shows cell 240 of network environment 200 in substantially the same state as in FIG. 2B. Some features not shown in FIG. 2C that are depicted in FIG. 2B have been omitted to clarity of disclosure.

FIG. 2C indicates that positions can be represented utilizing one or more geographic coordinates of a geographic coordinate system, including Cartesian and/or polar coordinates. In some cases, the positions that are monitored comprise at least angles corresponding to the equipment with respect to a reference substantially at the center of the cell, such as the base station. For example, an angle of equipment can be determined from the aforementioned DoA calculation, and/or from GPS data. The angle of a UE can correspond to an angle of a beamform to the UE, such as an angle of a main lobe of the UE, as the main lobe is directed toward the UE. As an example, FIG. 2C shows angle 236 of main lobe 260, which could be derived from position data of UE 226*a*. As shown, angle 236 may be measured from a reference angle. Although shown as 0 degrees, a different reference angle could be used. Although not shown, it will be appreciated that small cells can similarly have their angles monitored.

Furthermore, in some cases, the positions that are monitored comprise lengths, or distances, corresponding to the equipment with respect to a reference substantially at the center of the cell, such as the base station. For example, a distance to equipment can be determined from aforementioned RF communications and/or GPS data. Where RF communications are employed, distances may be calculated, for example, based on timing between RF communications. The distance to a UE can correspond to a length of a beamform to the UE, such as a length of a main lobe of the UE, as the main lobe is directed toward the UE. As an example, FIG. 2C shows length 234 of main lobe 260, which can be calculated based on position data from UE 226*a*. Although length 234 is approximately the full length of main lobe 260, the length could be less than the full length. For example, the length could be bounded by an approximate position of UE 226*a*, as an example. As shown, the length may be with respect to a reference substantially at the center of the cell, such as macro cell base station 218. Although not shown, it will be appreciated that small cells can similarly have their distances monitored.

Beamforming selection module 220 can calculate one or both of distances and angles (e.g., length 234 and angle 236) for each of the equipment to determine whether one or more small cells are available to serve UE. For example, for UE 226*a*, beamforming selection module 220 may utilize at least angle 236 to determine whether a small cell is positioned within main lobe 260 of beamform 250. As an example, a position of small cell base station 228*n* could be compared to angle 236 to determine whether small cell base station 228*n* is positioned within main lobe 260. In some cases, this determination could compare an angle of small cell base station 228*n* to angle 236. Small cell base station 228*n* could be determined as being positioned within main lobe 260 where the angle is within upper and lower threshold angles of angle 236, corresponding to main lobe 260.

As a further example, beamforming selection module 220 may utilize at least length 234 to determine whether a small cell is sufficiently close to UE 226*a* so as to be available to serve UE 226*a*. As an example, a position of small cell base station 228*n* could be compared to length 234 to determine whether small cell base station 228*n* is near UE 226*a*. In some cases, this determination could compare a length of small cell base station 228*n* to length 234. Small cell base station 228*n* could be determined as being sufficiently close where the length is within an upper and lower threshold of length 234. It will be appreciated that many approaches are available in determining small cell availability to serve UE based on position data. In another approach, beamforming selection module 220 could determine a distance between small cell base station 228*n* and UE 226*a*. Small cell base station 228*n* may be determined as sufficiently close where the distance does not exceed a threshold amount.

FIG. 2C shows cell 240 divided into an angled grid, which may optionally be utilized by beamforming selection module 220 in determining whether to disable beamforming to UE from macro cell base station 218. As shown, the angled grid comprises twelve wedges, by way of example, such as wedges 240*a*, 240*b*, and 240*c*. Also shown, the wedges may be further divided into wedge cells. Beamforming selection module 220 can determine that a small cell is positioned within a main lobe of a beamform based on the main lobe (or UE) being positioned within the same wedge and/or wedge cell as the small cell or small cell base station. For example, in FIG. 2C, UE 226*a*, main lobe 260, and small cell base station 228*n* are each positioned within wedge 240*a*. In making such a determination, beamforming selection module 220 could employ the aforementioned angle information, for example, with the angles of the wedge defining the upper and lower threshold angles.

Similarly, the angled grid could be employed by beamforming selection module 220 to determine whether a small cell is sufficiently close to a UE so as to be available to the UE. As an example, beamforming selection module 220 can determine that a small cell is sufficiently close to the UE based on the UE (or a point along the length of a main lobe directed toward the UE) being positioned within the same wedge cell as the small cell. For example, in FIG. 2C, UE 226*a*, an endpoint of main lobe 260, and small cell base station 228*n* are each positioned within the same wedge cell. In making such a determination, beamforming selection module 220 could employ the aforementioned distance information, for example, with the distances of the wedge cell defining the upper and lower threshold amounts. It will be appreciated that the angle and distance information, or other position data, can be employed by beamforming selection module 220 to determine that the UE (or the point along the length of the main lobe), is positioned within the same wedge cell as the small cell base station.

In addition to, or instead of analyzing the aforementioned position data, other factors can be considered in determining small cell availability to serve UE. Examples include an operational state of the UE, position data of the UE with respect to macro cell base station 218, the type of communication session the UE is engaged in over network 224, and signal strength and/or signal quality available for the communication links with the small cells.

As another example, availability of a small cell to serve a UE may be based, at least in part, on loading on the small cell. For example, beamforming selection module 220 may determine that the small cell corresponding to small cell base station 228*n* is overloaded, and is therefore unavailable to serve UE 226*a*. In this regard, beamforming selection module 220 could analyze loading data of small cell base station 228*n* to make such a determination.

Furthermore, availability of a small cell may be based, at least in part, on a number of UE already being served by the small cell. Where beamforming selection module 220 identifies that the number exceeds a threshold amount, beamforming selection module 220 may determine that the small cell is unavailable to serve the UE.

In determining whether to disable beamforming to UE from macro cell base station 218, beamforming selection module 220 may consider additional factors. One such factor may be a number of small cells that are positioned within the main lobe of the beamform and/or sufficiently close to the UE. Beamforming selection module 220 may refrain from disabling beamforming to the UE based on determining that the number of small cells is less than a threshold amount. For example, with reference to FIG. 2B, beamforming selection module 220 may determine that there is one small cell positioned within main lobe 260 of beamform 250 and/or sufficiently close to UE 226*a* (i.e., small cell base station 228*n*). Beamforming selection module 220 may refrain from disabling the beamforming based on the one small cell being less than a threshold amount of two small cells, or some other predefined amount.

Thus, it will be appreciated that even though beamforming selection module 220 may determine that small cell base station 228*n* is available to serve UE 226*a*, beamforming selection module 220 may still refrain from disabling beamforming from the macro cell. Considering a number of small cells positioned within the main lobe is one effective heuristic that can allow for beamforming selection module 220 to effectively utilize less precise means to determine the availability of small cells to serve UE 226*a* (such imprecision may be desirable to reduce processing load). In particular, as the number of small cells positioned within the main lobe increases, so does the likelihood that at least one small cell is available to sufficiently serve the UE.

Although the number of small cells positioned within the main lobe has been described as an example, it will be appreciated that the above principle can be generalized to the number of small cells positioned within a designated region corresponding to the UE (e.g., a region that includes the UE), and/or the beamform. As an example, the disabling could be determined based on the number of small cells that are both positioned within the main lobe as well as positioned within the same sector as the UE. Furthermore, as indicated above, the region can correspond to at least one wedge and/or at least one wedge cell of the angled grid that may be utilized in analyzing position data.

Thus, as described above, beamforming selection module 220 can consider various factors in determining whether to disable beamforming to UE from the macro cell. Although UE 226*a* is shown, similar factors can be employed for each of the UE in cell 240. Many of these factors can vary over time. Thus, beamforming selection module 220 periodically determines these factors, as well as whether to disable beamforming to UE from the macro cell.

With respect to FIG. 2C, assume that beamforming selection module 220 determines not to disable beamforming to UE 226*a* while UE 226*a* is positioned within wedge 240*a*. As UE 226*a* moves toward small cell base stations 228*a* and 228*b*, the location of UE 226*a* and corresponding beamform 250 changes, as reflected in periodically updated position data. Beamforming selection module 220 may utilize the updated position data to eventually determine that those small cells are available to serve UE 226*a*. As a specific example, when UE 226*a* enters wedge 240*b*, beamforming selection module 220 may determine that small cell base stations 228*a* and 228*b* are each available to serve UE 226*a* based on determining that small cell base stations 228*a* and 228*b* are with main lobe 260 of beamform 250 (e.g., utilizing an updated angle of main lobe 260). Furthermore, beamforming selection module 220 may select to disable beamforming to UE 226*a* from the macro cell based on the determination that small cell base stations 228*a* and 228*b* are available to serve UE 226*a*. As such, beamforming to UE 226*a* may be disabled such as is shown in FIG. 2D.

Figure 2D:
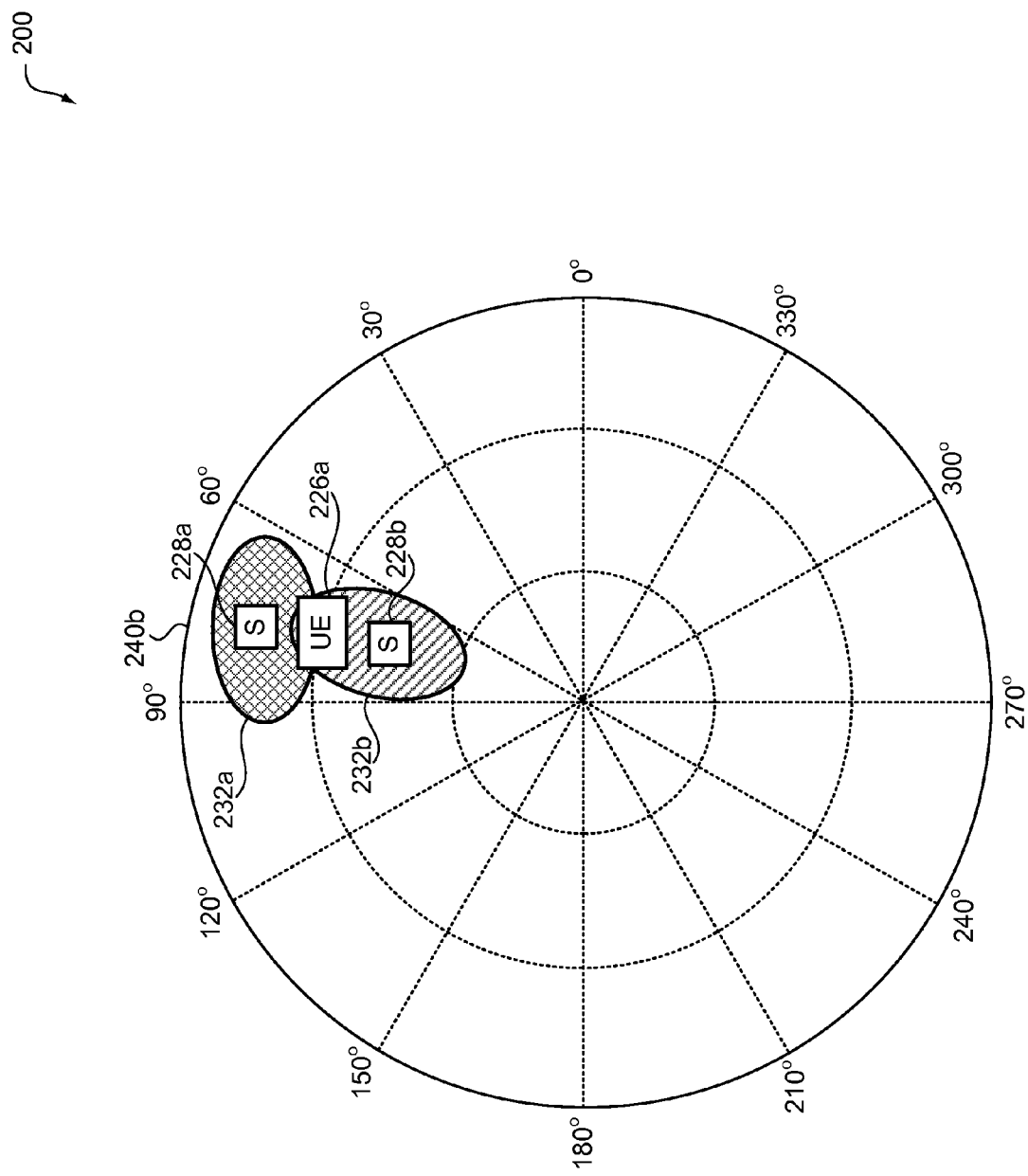
FIG. 2D illustrates a top view of an exemplary network environment in which implementations of the present disclosure may be employed.

Referring to FIG. 2D, FIG. 2D shows an exemplary cell in which implementations of the present disclosure may be employed. In particular, FIG. 2D shows cell 240 of network environment 200. Between FIG. 2C and FIG. 2D, beamforming selection module 220 has selectively disabled beamforming to UE 226*a*. In some cases, after beamforming to UE has been disabled, macro cell base station 218 still utilizes a directional antenna for a communication link with the UE without beamforming. In other cases, macro cell base station 218 substantially ceases communication with the UE.

In either case, UE 226*a* may subsequently be served by at least one small cell. For example, assume that after the beamforming was selectively disabled to UE 226*a*, macro cell base station 218 utilized a directional antenna for a communication link with UE 226*a* without beamforming. The communication link without the beamforming was of lower quality than the communication link with beamforming. As UE 226*a* is within coverage areas 232*a* and 232*b* of small cell base stations 228*a* and 228*b*, small cell base station 228*b*, for example, may have begun to serve UE 226*a* to improve the quality of communications between the network and UE 226*a*. For example, the Het-Net may have handed off communications to small cell base station 228*b* without specific consideration as to whether the beamforming had been selectively disabled.

In further respects, beamforming may be enabled for UE (e.g. re-enabled) with respect to the macro cell based on the availability of small cells to sufficiently serve the UE. For example, beamforming may be enabled where small cells are unavailable to sufficiently serve the UE. The availability of the small cells need not be determined based on the same criteria utilized in determining whether to disable the beamforming, as exemplified below with respect to FIG. 2E.

Figure 2E:
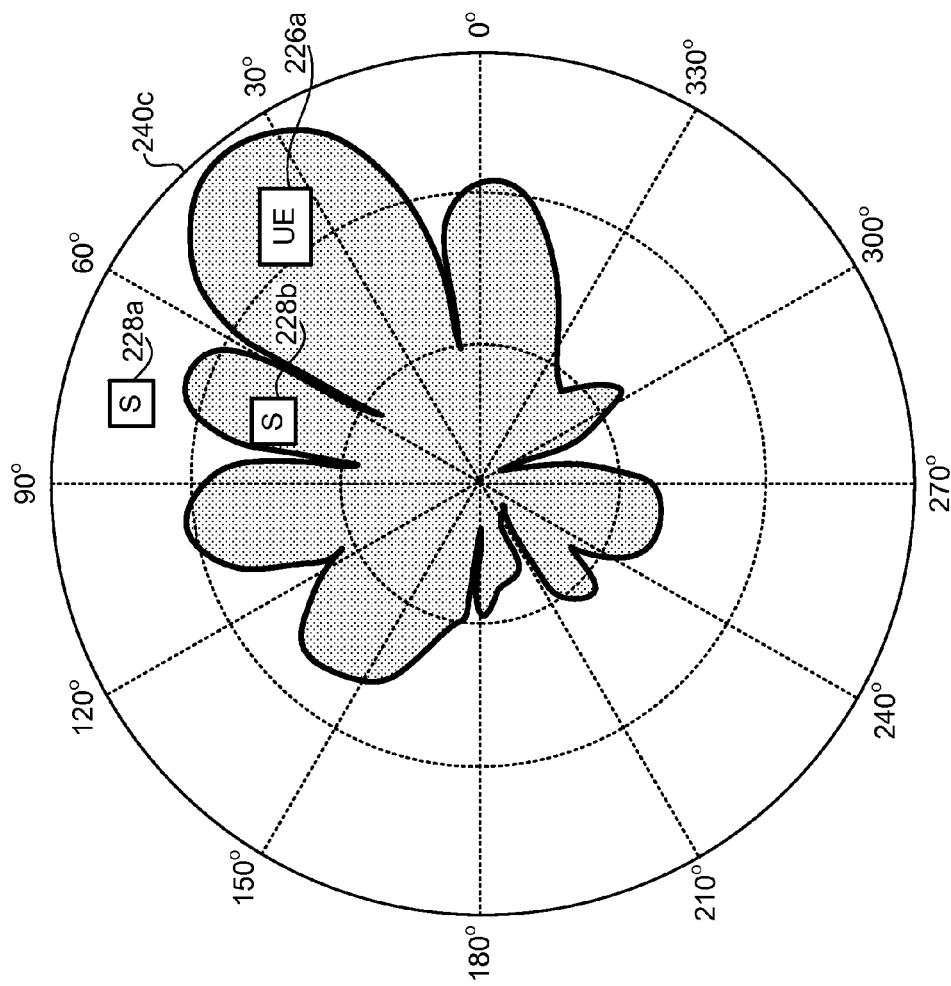
FIG. 2E illustrates a top view of an exemplary network environment in which implementations of the present disclosure may be employed.

Referring now to FIG. 2E, FIG. 2E shows an exemplary cell in which implementations of the present disclosure may be employed. In particular, FIG. 2E shows cell 240 of network environment 200. Between FIG. 2D and FIG. 2E, beamforming selection module 220 has selectively re-enabled beamforming to UE 226*a*. In FIG. 2E, small cell base stations 228*a* and 228*b* are no longer available to serve UE 226*a*. For example, UE 226*a* may have moved out of the coverage areas of the small cells. Furthermore, no other small cells are available to serve UE 226*a*. As such, UE 226*a* may reconnect to macro cell base station 218. For example, the Het-Net may handoff communications to the macro cell. The handoff may optionally result in macro cell base station 218 initially communicating with UE 226*a* without beamforming. In various implementations, macro cell base station 218 enables beamforming to UE 226*a* based on UE 226*a* reconnecting to the macro cell. UE 226*a* may have been tracked as a UE that has had beamforming disabled and has disconnected from the macro cell. When UE 226*a* reconnects to the macro cell, beamforming selection module 220 can identify UE 226*a* as a tracked UE and as a result selectively re-enable beamforming to UE 226*a*. In this way, the unavailability of one or more small cells to serve UE 226*a* may be implicit in UE 226*a* reconnecting to the macro cell. Thus, network resources can be conserved by avoiding complex processing utilized to determine small cell availability.

Figure 3:
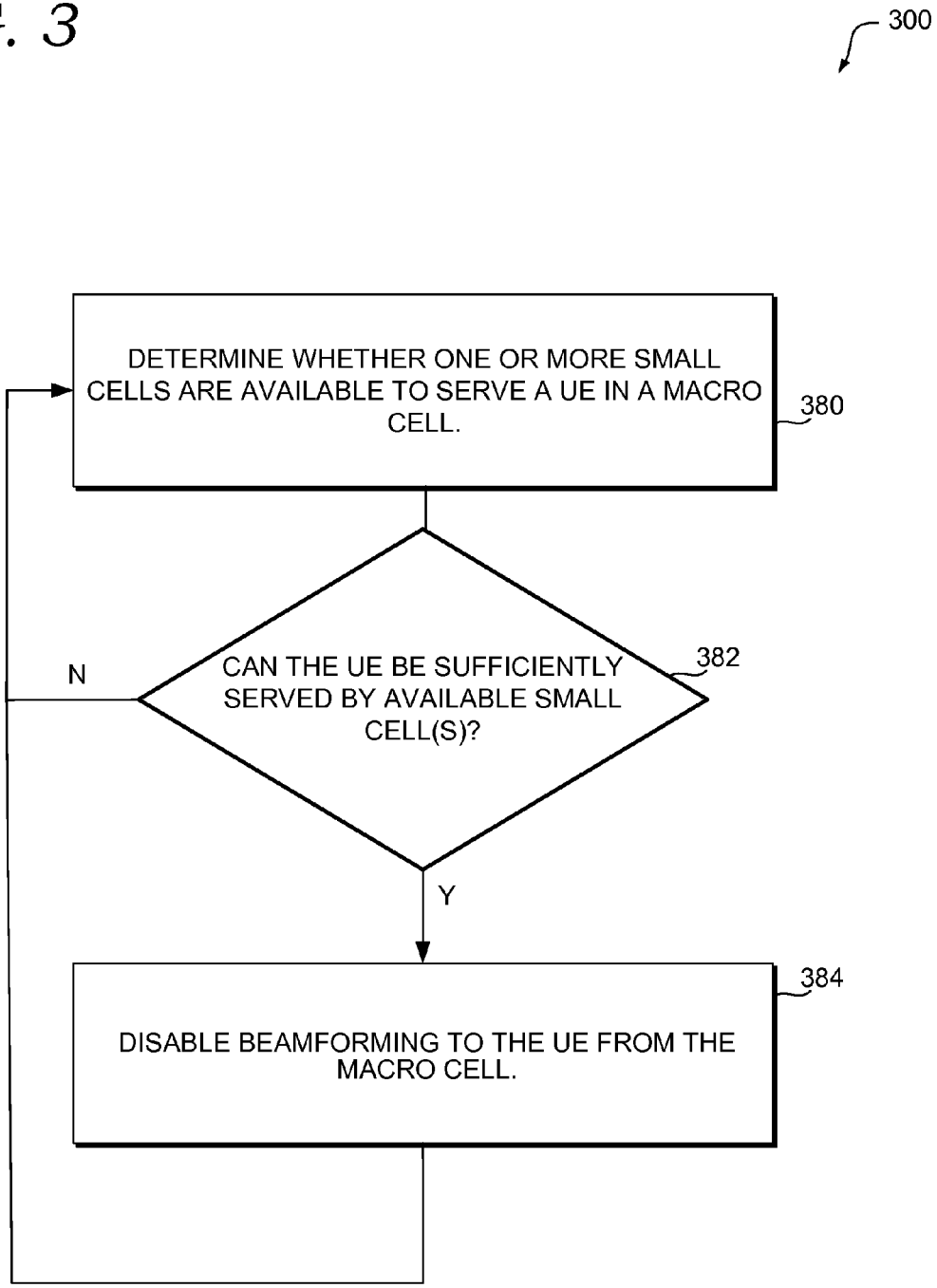
FIG. 3 depicts a flow diagram of an exemplary method for beamforming selection for macro cells based on small cell availability, in accordance with implementations of the present disclosure.

Referring now to FIG. 3, FIG. 3 depicts a flow diagram of an exemplary method 300 for beamforming selection for macro cells based on small cell availability, in accordance with implementations of the present disclosure. Method 300 is described below with respect to network environment 200, for illustrative purposes only. However, method 300 is not limited to particular features of network environment 200 described herein. Furthermore, what is shown in FIG. 3 should not necessarily be considered comprehensive with respect to method 300 in that certain procedures may be omitted or additional procedures may be employed. Also, certain orderings of those procedures indicated by FIG. 3 should not be considered limiting and may be altered in certain implementations of the present disclosure.

At block 380, method 300 includes determining whether one or more small cells are available to serve a UE in a macro cell. For example, referring to FIGS. 2B and 2C, beamforming selection module 220 may determine whether one or more small cells are available to serve UE 226*a* in cell 240. In doing so, beamforming selection module 220 may determine positions of each UE in cell 240, such as UE 226*a* and 226*b* through 226*n*. Beamforming selection module 220 may also determine positions of each small cell in cell 240, such as small cell base stations 228*a* and 228*b* through 228*n*.

Referring to FIG. 2C, beamforming selection module 220 may determine that only small cell base station 228*n* is available to serve UE 226*a* based on determining that small cell base station 228*n* is positioned within main lobe 260 of beamform 250. Such a determination may comprise identifying that main lobe 260 is positioned within wedge 240*a* of cell 240 and based on the identification determining whether small cell base station 228*n* is positioned within identified wedge 240*a* of cell 240.

At block 382, method 300 includes determining whether the UE can be sufficiently served by available small cell(s). For example, beamforming selection module 220 may determine that UE 226*a* cannot be sufficiently served by small cell base station 228*n*. As an example, such a determination may be based, at least in part on determining that the number small cells positioned within main lobe 260 is does not exceed a threshold amount (e.g., one small cell).

As indicated in FIG. 3, blocks 380 and 382 may be repeated with respect to the UE until beamforming selection module 220 determines that UE 226*a* can be sufficiently served by available small cell(s). However, method 300 might proceed to block 384 for one or more other UE. Referring to FIG. 2D, with respect to the UE, at a subsequent iteration of block 380, beamforming selection module 220 may determine that both small cell base stations 228*a* and 228*b* are available to serve UE 226*a*. At a corresponding iteration of block 382, beamforming selection module 220 may determine that UE 226*a* can be sufficiently served by small cell base stations 228*a* and 228*b* based on determining that the number small cells positioned within main lobe 260 exceeds the threshold amount (e.g., one small cell). As such, method 300 may proceed to block 384 with respect to UE 226*a*.

As block 384, method 300 includes disabling beamforming to the UE from the macro cell. For example, beamforming selection module 220 can disable beamforming to UE 226*a* from cell 240. Although beamforming is disabled to UE 226*a*, macro cell base station 218 can still communicate to UE 226*a* without beamforming. Furthermore, the network may transition from communicating data to UE 226*a* from macro cell base station 218 to communicating data to UE from a small cell, such as one of small cell base stations 228*a* and 228*b*. As indicated above, although method 300 has been described with respect to UE 226*a*, method 300 can be performed with respect to each UE in cell 240. In some cases, instances of at least some of blocks 380, 382, and 384 are performed contemporaneously with respect to each UE, but this need not be the case.

Figure 4:
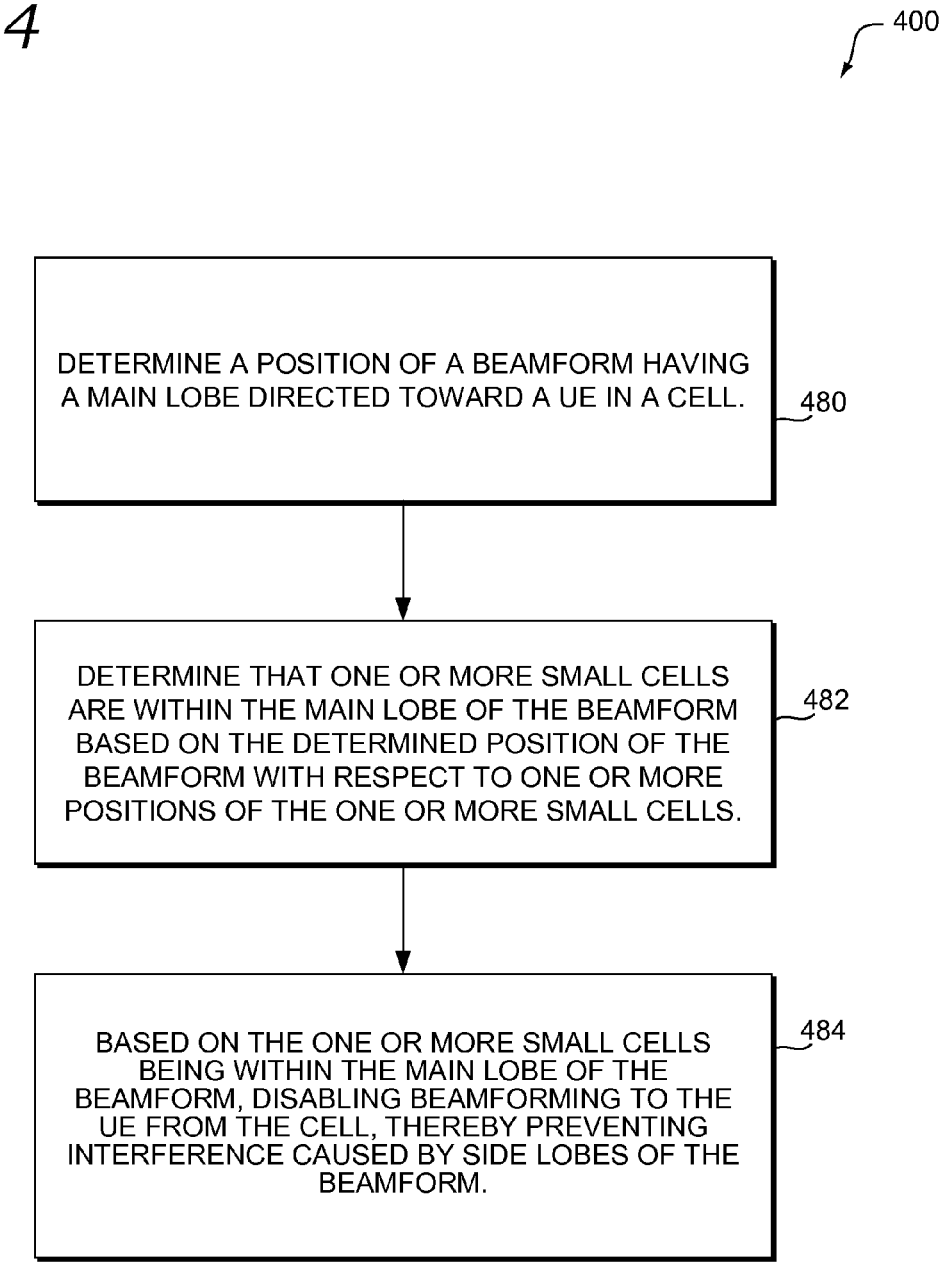
FIG. 4 depicts a flow diagram of an exemplary method for beamforming selection for macro cells based on small cell availability, in accordance with implementations of the present disclosure.

Referring now to FIG. 4, FIG. 4 depicts a flow diagram of an exemplary method 400 for beamforming selection for macro cells based on small cell availability, in accordance with implementations of the present disclosure. Method 400 is described below with respect to network environment 200, for illustrative purposes only. However, method 400 is not limited to particular features of network environment 200 described herein. Furthermore, what is shown in FIG. 4 should not necessarily be considered comprehensive with respect to method 400 in that certain procedures may be omitted or additional procedures may be employed. Also, certain orderings of those procedures indicated by FIG. 4 should not be considered limiting and may be altered in certain implementations of the present disclosure.

At block 480, method 400 includes determining a position of a beamform having a main lobe directed toward a UE in a cell. For example, referring to network environment 200 sometime between FIGS. 2C and 2D, and prior to disabling beamforming to UE 226*a* from macro cell base station 218, beamforming selection module 220 can determine a position of beamform 250 having main lobe 260 directed toward UE 226*a* in cell 240. The position can comprise, for example, an angle, similar to angle 236 in FIG. 2C and/or a length, or distance, similar to length 234, although with UE 226*a* being positioned closer to wedge 240*b*. Beamforming selection module 220 can determine the position data utilizing one or more RF communications with UE 226*a*, as an example. Beamforming selection module 220 may also determine positions of small cells within cell 240. The determination may optionally include identifying the small cells within database 222 and extracting corresponding position data from database 222. As an alternative, at least some of the positions could be measured by beamforming selection module 220, such as by utilizing one or more RF communications, similar to the UE.

At block 482, method 400 includes determining that one or more small cells are positioned within the main lobe of the beamform based on the determined position of the beamform with respect to one or more positions of the one or more small cells. For example, based on the angle or other position data, beamforming selection module 220 can determine that small cell base stations 228*a* and 228*b* are positioned within main lobe 260 of beamform 250. Beamforming selection module 220 may determine that the angle of main lobe 260 places main lobe 260 within wedge 240*b*. Beamforming selection module 220 may further determine that the positions of small cell base stations 228*a* and 228*b* place corresponding small cells within wedge 240*b*. Based on determining that the main lobe and the small cells are each positioned within wedge 240*b*, beamforming selection module 220 may determine that the small cells are positioned within the main lobe.

At block 484, method 400 includes based on the one or more small cells being positioned within the main lobe of the beamform, disabling beamforming to the UE from the cell, thereby preventing interference caused by side lobes of the beamform. For example, based on small cell base stations 228*a* and 228*b* being positioned within main lobe 260 of beamform 250, beamforming selection module 220 can disable beamforming to UE 226*a* from cell 240. FIG. 2D shows UE 226*a* after the beamforming has been disabled. As an example, based on the determination at block 482, beamforming selection module 220 can determine that small cell base stations 228a and 228b are each available to serve UE 226a. This determination could also be based on beamforming selection module 220 determining that small cell base stations 228a and 228b and an endpoint of a length of main lobe 260 each are positioned within the same wedge cell and/or any of the various other factors described herein.

Figure 5:
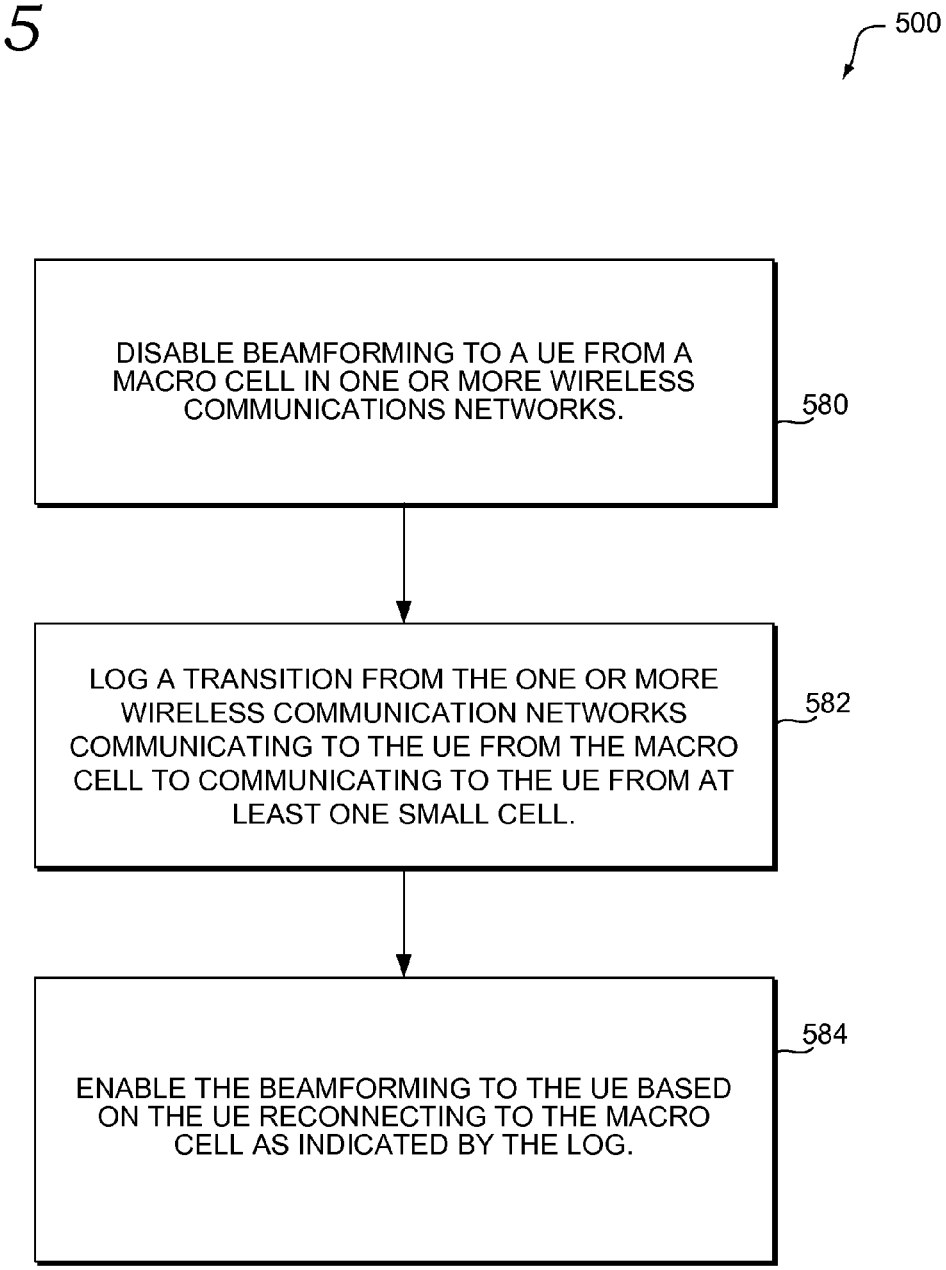
FIG. 5 depicts a flow diagram of an exemplary method for beamforming selection for macro cells based on small cell availability, in accordance with implementations of the present disclosure.

Referring now to FIG. 5, FIG. 5 depicts a flow diagram of an exemplary method 500 for beamforming selection for macro cells based on small cell availability, in accordance with implementations of the present disclosure. Method 500 is described below with respect to network environment 200, for illustrative purposes only. However, method 500 is not limited to particular features of network environment 200 described herein. Furthermore, what is shown in FIG. 5 should not necessarily be considered comprehensive with respect to method 500 in that certain procedures may be omitted or additional procedures may be employed. Also, certain orderings of those procedures indicated by FIG. 5 should not be considered limiting and may be altered in certain implementations of the present disclosure.

At block 580, method 500 includes disabling beamforming to a UE from a macro cell in one or more wireless communications networks. Continuing with the example described with respect to method 400, beamforming selection module 220 has disabled beamforming to UE 226a from cell 240 in network 226, which can comprise a heterogeneous network, such as has been described with respect to block 484.

At block 582, method 500 includes logging a transition from the one or more wireless communications networks communicating data to the UE from the macro cell to communicating data to the UE from at least one small cell. For example, beamforming selection module 220 can log a transition from network 224 communicating data to UE 226a from cell 240 to network 224 communicating data to UE 226a from small cell base station 228b. In some cases, network 224 may have continued to communicate with UE 226a from cell 240 without beamforming after the beamforming was disabled from cell 240. However, without beamforming, the quality of communications may have dropped, such that the heterogeneous network hands off the communicating data to small cell base station 228b. As such, UE 226a may disconnect from cell 240 and connect to small cell base station 228b. In some implementations, beamforming selection module 220 logs the transition based on detecting UE 226a disconnecting from cell 240. In other cases, the transition may be logged based on detecting UE 226a connecting to small cell base station 228b after having had beamforming disabled.

At block 484, method 400 comprises enabling beamforming to the UE based on the UE reconnecting to the macro cell as indicated by the log. For example, beamforming selection module 220 may re-enable beamforming to UE 226a based on UE 226a reconnecting to cell 240, as indicated by the log from block 482. As an example, UE 226a may have moved to wedge 240c and out of range of small cell base stations 228a and 228b. As a result, the heterogeneous network may have handed off the communicating data to cell 240. Beamforming selection module 220 may detect UE 226a connecting to cell 240 and determine that UE 226a is reconnecting to cell 240 after having had beamforming disabled based on the log and/or the beamforming to UE 226a being in a disabled state when connecting to cell 240. In response, beamforming selection module 220 can re-enable beamforming to UE 226a. FIG. 2E can correspond to UE 226a after the beamforming has been re-enabled.

Thus, in accordance with implementations of the present disclosure, network environment 200 can comprise beamforming selection module 220 selectively disabling beamforming to some UE from cell 240 while refraining from disabling beamforming to other UE from cell 240. As at least one small cell may be available to sufficiently serve the UE having the beamforming disabled, communications performance of the UE can be maintained while preventing interference caused by the beamforming. Furthermore, beamforming selection module 220 can re-enable beamforming to UE, so as to maintain communications performance as conditions in network environment 200 change over time. Thus, network environment 200 is adaptable and capable of maintaining enhanced communications performance.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for reducing interference from beamforms in one or more wireless communications networks, the method comprising:
    communicating data to a plurality of user equipment (UE) in a cell using a plurality of beamforms, each of the plurality of beamforms having a main lobe and side lobes, the main lobe being directed toward a corresponding UE of the plurality of UE; and
    for each beamform of the plurality of beamforms:
        determining a position of the beamform in the cell,
        identifying one or more positions of one or more small cells,
        determining that the one or more small cells of a plurality of small cells in the cell are available to serve the corresponding UE of the beamform based on determining that the one or more small cells are positioned within the main lobe of the beamform using the determined position of the beamform and the identified one or more positions of the one or more small cells, and
        based on the one or more small cells being determined as available to serve the corresponding UE, disabling beamforming to the corresponding UE from the cell, thereby preventing the side lobes of the beamform from interfering with other radio communications in the cell, the disabling of the beamforming comprising disabling the beamform directed toward the corresponding UE.

2. The method of claim 1, wherein the determining the position of the beamform comprises calculating the position from a position of the corresponding UE.

3. The method of claim 1, wherein the position of the beamform comprises an angle of the beamform with respect to the cell.

4. The method of claim 1, wherein the position of the beamform comprises a length of the beamform with respect to the cell.

5. The method of claim 1, wherein the plurality of UE and the plurality of small cells are part of a heterogeneous network.

6. The method of claim 1, wherein the disabling beamforming to the corresponding UE is further based on determining that a number of the one or more small cells positioned within the main lobe exceeds a threshold amount.

7. The method of claim 1, wherein the determining the position of the beamform in the cell comprises calculating the position from a radio frequency (RF) communication between the corresponding UE and a base station of the cell.

8. The method of claim 1, further comprising enabling the beamforming to the corresponding UE based on the corresponding UE reconnecting to the cell, wherein the corresponding UE was disconnected from the cell and connected to at least one of the plurality of small cells based on the disabling of the beamforming to the corresponding UE from the cell.

9. The method of claim 1, wherein the plurality of UE are distributed amongst different sectors of the cell, each sector having a respective RF scheduler for the communicating data with respect to ones of the plurality of UE in the sector.

10. One or more non-transitory computer-readable media having computer-executable instructions embodied thereon that, when executed, perform a method for reducing interference from beamforms, the method comprising:
    communicating data to a plurality of user equipment (UE) in a macro cell in one or more wireless communications networks using beamforming from the macro cell, the communicating data to a UE of the plurality of UE using a beamform;
    disabling the beamforming from the macro cell for the UE of the plurality of UE based on determining that one or more small cells of a plurality of small cells in the macro cell are available to serve the UE, thereby preventing the beamforming from the macro cell for the UE from interfering with other radio communications in the macro cell, the disabling of the beamforming comprising disabling the beamform; and
    transitioning the communicating data, for the UE in the macro cell, from the macro cell to at least one of the plurality of small cells based on the disabling of the beamforming from the macro cell for the UE.

11. The one or more computer-readable media of claim 10, further comprising enabling the beamforming to the UE from the macro cell based on the UE reconnecting to the macro cell after the disabling of the beamforming from the macro cell.

12. The one or more computer-readable media of claim 10, wherein the transitioning of the communicating data comprises handing off the communicating data from the macro cell to the at least one of the plurality of small cells.

13. The one or more computer-readable media of claim 10, further comprising:
    logging, with respect to the UE, the transitioning of the communicating data from the macro cell to the at least one of the plurality of small cells; and
    enabling the beamforming to the UE based on the UE reconnecting to the macro cell as indicated by the logging.

14. The one or more computer-readable media of claim 10, wherein the determining that the one or more small cells of the plurality of small cells of the one or more wireless communications networks are available to serve the UE comprises determining that the one or more small cells are positioned within a main lobe of a beamform from the macro cell to the UE.

15. The one or more computer-readable media of claim 10, wherein the determining that the one or more small cells of the plurality of small cells are available to serve the UE is based on one or more positions of the one or more small cells with respect to a position of a beamform from the macro cell to the UE.

16. The one or more computer-readable media of claim 10, wherein the disabling the beamforming from the macro cell for the UE is further based on determining that a number of the one or more small cells available to serve the UE exceeds a threshold amount.

17. The one or more computer-readable media of claim 10, wherein the one or more wireless communications networks comprises a heterogeneous network.

18. A beamforming system for reducing interference from beamforms, the beamforming system comprising:
    a beamforming selection module comprising one or more processors and one or more non-transitory computer-readable media having computer-executable instructions embodied thereon that when executed by the one or more processors perform operations comprising:
        monitoring a position of a beamform to a UE in a macro cell in one or more wireless communications networks;
        identifying positions of one or more small cells in the one or more wireless communications networks;
        determining that the one or more small cells are available to serve the UE based on the monitored position of the beamform with respect to the identified positions of the one or more small cells; and
        disabling beamforming to the UE from the macro cell based on the determining that the one or more small cells are available to serve the UE, thereby preventing the side lobes of the beamform from interfering with other radio communications in the macro cell, the disabling the beamforming comprising disabling the beamform to the UE.

19. The beamforming system of claim 18, wherein the UE is disconnected from the macro cell based on the disabling of the beamforming to the UE from the macro cell, and the beamforming selection modules enables the beamforming to the UE from the macro cell based on detecting that the UE has reconnected to the macro cell after having been connected to at least one small cell.

20. The beamforming system of claim 18, wherein the beamforming selection module identifies the positions of the one or more small cells from a heterogeneous network system database of the one or more wireless communications networks.

* * * * *